(12) United States Patent
Wallace

(10) Patent No.: US 7,219,118 B2
(45) Date of Patent: May 15, 2007

(54) SIMD ADDITION CIRCUIT

(75) Inventor: Andrew Paul Wallace, Bristol (GB)

(73) Assignee: Broadcom Corporation, Irvine, CA (US)

( * ) Notice: Subject to any disclaimer, the term of this patent is extended or adjusted under 35 U.S.C. 154(b) by 540 days.

(21) Appl. No.: 10/283,246

(22) Filed: Oct. 30, 2002

(65) Prior Publication Data
US 2003/0088603 A1 May 8, 2003

Related U.S. Application Data

(60) Provisional application No. 60/331,017, filed on Nov. 6, 2001.

(51) Int. Cl.
*G06F 7/38* (2006.01)
*G06F 7/50* (2006.01)
(52) U.S. Cl. .................................. 708/518; 708/710
(58) Field of Classification Search ................ 708/518
See application file for complete search history.

(56) References Cited

U.S. PATENT DOCUMENTS

| | | | | |
|---|---|---|---|---|
| 4,707,800 A | * | 11/1987 | Montrone et al. | 708/518 |
| 4,768,160 A | * | 8/1988 | Yokoyama | 708/518 |
| 5,189,636 A | * | 2/1993 | Patti et al. | 708/518 |
| 5,278,783 A | * | 1/1994 | Edmondson | 708/711 |
| 5,327,369 A | * | 7/1994 | Ashkenazi | 708/518 |
| 5,390,135 A | * | 2/1995 | Lee et al. | 708/518 |
| 5,757,685 A | * | 5/1998 | Ohuchi | 708/490 |
| 5,883,824 A | * | 3/1999 | Lee et al. | 708/518 |
| 6,449,629 B1 | * | 9/2002 | Morgan | 708/518 |
| 6,519,622 B1 | * | 2/2003 | Knowles | 708/710 |

FOREIGN PATENT DOCUMENTS

GB  2 342 193  4/2000

OTHER PUBLICATIONS

Simon Knowles, "A Family of Adders", *IEEE*, pp. 30-37, 1999.

* cited by examiner

*Primary Examiner*—Tan V. Mai
(74) *Attorney, Agent, or Firm*—Sterne, Kessler, Goldstein & Fox PLLC

(57) ABSTRACT

A system for adding multiple sets of numbers via a fixed-width adder includes an adder for receiving each of the sets of binary numbers at corresponding sets of adder inputs, and for generating a sum of each set of binary numbers. Each set of numbers defines a distinct data path through the adder. For each set of numbers, the system further includes a logic gate for inhibiting a carry path, from each portion of the adder corresponding to each carry path, to a next adjacent carry path. The system isolates two or more contiguous data paths through the fixed-width adder corresponding to each of the two or more sets of two binary numbers. The invention prevents unwanted signals from crossing summing lane boundaries in different processing modes. The same adder logic can thus be used for each processing mode by varying the combination of mode select control signals.

16 Claims, 3 Drawing Sheets

SIMD ADDITION CIRCUIT

CROSS-REFERENCE TO RELATED APPLICATION

This application claims priority to Provisional U.S. Patent Application No. 60/331,017 filed Nov. 6, 2001, which is incorporated herein by reference in its entirety.

FIELD OF THE INVENTION

The present invention relates to circuits for performing binary addition (also referred to herein as "adder circuits," or more simply, "adders") and more particularly, to adder circuits that are configurable to add multiple sets of binary numbers having variable data widths.

BACKGROUND OF THE INVENTION

Binary adder circuits are well known in the art as fundamental components of computer processing architectures. Many adder implementations exist to provide advantages with respect to processing speed, design efficiency (i.e., minimize size of resulting circuitry), and other architectural parameters.

In the oldest (and still most common) type of processing, a processor executes a single instruction stream that operates upon a single data stream. This type of processing is commonly referred to as "Single Instruction Single Data," or "SISD," and is utilized by all personal computers, and nearly all other computers except those designed and fabricated until fairly recently. SISD processing is useful for a large number of applications, but can be slow and awkward for certain types of numerical operations, such as array and matrix operations. For example, suppose a processor must evaluate the sum of a 10 element array A and a constant k, i.e., k+A. With SISD processing, the processor must evaluate each element of the array A serially, i.e., k+A(0), k+A(1) . . . k+A(8), and k+A(9), in order to produce the resulting sum.

A more efficient processing scheme for handling such array structures is commonly referred to as "Single Instruction Multiple Data," or "SIMD." In SIMD processing, a processor executes a single instruction stream that operates on multiple data streams simultaneously. Typically, source and destination registers hold data in the form of bit sequences. An SIMD processor can treat the data as one or a plurality of data elements, each defining a separate SIMD lane. The size of the SIMD lane employed is defined in the instruction and can change from one instruction to the next. The processor may include multiple CPUs operating in parallel on the different elements of the array. Such processing architectures typically operate synchronously, i.e., each individual processor operates in lock-step with the other CPUs, such that the CPUs all execute a particular instruction in lock-step. Using the example above, in an SIMD processor the first CPU would perform the sum for the first element of the array A (i.e., A(0)+k), the second CPU would perform the sum for the second element of the array A (i.e., A(1)+k), etc., such that all 10 elements of the array A would be evaluated in one instruction period.

Generally, prior art adders are characterized by a fixed data width. With an SISD processing architecture, the processor handles one data element at a time, so a fixed-width adder is typically selected to match the expected data width of the data element. If the data element is smaller than the selected adder, the data element can be padded with zeros to match the size of the adder.

Recent SIMD architectures have included instructions that request a target adder to operate in multiple summing modes, depending on the size of the data elements being processed. For example, an SIMD processing architecture may include a 64 bit adder, and a particular SIMD instruction may require the adder to produce the sum of two 64-bit numbers. A subsequent SIMD instruction may require the same adder to simultaneously add four 16-bit numbers from an array. Yet another SIMD instruction may require the adder to produce the sum of eight eight-bit numbers. Thus, in this example, the same adder would be required to implement a single 64-bit data summing lane, four 16-bit data summing lanes, and eight eight-bit summing lanes. Prior art SIMD architectures have implemented such multi-mode summers by adding logic beyond the point where the data signals cross the summing lanes to simultaneously produce multiple summing mode results, then mixing the different results via a multiplexor to the output of the adder. The particular summing mode result the multiplexor selects thus depends upon the summing mode requested by the SIMD instruction.

One disadvantage to this configuration is that the additional circuitry needed to simultaneously produce the multiple summing modes and multiplex the results adds size and complexity to the adder.

Another disadvantage to this configuration is that the additional circuitry adds to the propagation delay through the adder.

It is an object of the present invention to substantially overcome the above-identified disadvantages and drawbacks of the prior art.

SUMMARY OF THE INVENTION

The present invention includes a method of and system for adding one or more sets of numbers, characterized by multiple, variable width summing channels. All adders constructed and arranged according to the present invention prevent unwanted signals (i.e., signals related to the carry path) from crossing summing lane boundaries in different processing modes. Further, by eliminating these unwanted signals selectively, by applying appropriate mode select signals (as described herein) the same adder architecture can be used for each processing mode simply by varying the combination of mode select control signals. Preferably, the method and system modifies an existing adder architecture to prevent the unwanted signals from crossing the lane boundaries without affecting the overall propagation delay through the adder.

The foregoing and other objects are achieved by the invention which in one aspect comprises a method of adding two or more sets of two N bit binary numbers with an M bit adder. The value of M is equal to the product of K and N (i.e., K*N), where K is an integer greater than or equal to two. The method includes providing each of the two or more sets of two N bit binary numbers to adjacent sets of N inputs of the M bit adder. The method also includes inhibiting a carry data path, from each N bit portion of the M bit adder corresponding to each set of two N bit binary numbers, to the next adjacent N bit portion of the M bit adder. Inhibiting the data path isolates a contiguous N bit data path through the M bit adder corresponding to each of the two or more sets of two N bit binary numbers. The method also includes receiving a sum at an output portion of the adder for each of the two N bit binary numbers. This output portion of the adder (for each set of two input numbers) is defined by the data path associated with the two N bit binary numbers.

In another embodiment of the invention, inhibiting a carry data path from each N bit portion of the M bit adder further includes providing a gating signal to a logical gate, along with a kill signal from a next least significant bit path in the adder. A predetermined state of the gating signal causes a kill signal to be propagated to the next more significant bit path of the adder. The kill signal prevents a carry generate at the next more significant stage of the adder, thus isolating adjacent N bit portions of the adder.

In another embodiment of the invention, the logical gate includes an AND gate.

In another embodiment of the invention, M is equal to 64, K is equal to two, and N is equal to 32. The method further includes providing each of the two sets of two 32 bit binary numbers to adjacent sets of 32 inputs of the 64 bit adder. The method also includes inhibiting a carry data path, from the least significant 32 bit portion of the 64 bit adder, to the most significant 32 bit portion of the 64 bit adder. Inhibiting the carry data path in this way isolates two contiguous 32 bit data paths through the 64 bit adder.

In another embodiment of the invention, M is equal to 64, K is equal to eight, and N is equal to eight. The method further includes providing each of the eight sets of two eight bit binary numbers to adjacent sets of eight inputs of the 64 bit adder. The method also includes inhibiting a carry data path, from each eight bit portion of the 64 bit adder corresponding to each set of two eight bit binary numbers, to the next adjacent eight bit portion of the 64 bit adder. Inhibiting the carry path in this way isolates a contiguous eight bit data path through the 64 bit adder corresponding to each of the two or more sets of two eight bit binary numbers.

In another aspect, the invention comprises a method of adding two or more sets of two binary numbers with a fixed-width adder. The method includes providing each of the two or more sets of two binary numbers to adjacent sets of inputs of the fixed-width adder, so as to define two or more data paths through the adder. Each data path corresponds to one of the sets of two binary numbers. The method further includes inhibiting a carry data path, from each portion of the adder corresponding to each of the data paths, to a next adjacent data path. Inhibiting the carry data path in this way isolates two or more contiguous data paths through the fixed-width adder corresponding to each of the two or more sets of two binary numbers. The method also includes receiving a sum at an output portion of the adder for each of the two binary numbers. This output portion of the adder (for each set of two input numbers) is defined by the data path associated with the two binary numbers.

In another aspect, the invention comprises a method of adding a first set of two N bit binary numbers and a second set of two N bit binary numbers with a 2N bit binary adder. The method includes providing the first set of two N bit binary numbers to the least significant N inputs of the 2N bit adder, and providing the second set of two N bit binary numbers to the most significant N inputs of the 2N bit adder. The method also includes inhibiting a carry data path, from a least significant portion of the 2N bit binary adder, to a most significant portion of the 2N bit binary adder via a gating signal. Inhibiting the carry data path in this way isolates a first N bit data path (corresponding to the first set of two N bit binary numbers) from a second N bit data path (corresponding to the second set of two N bit binary numbers). The method further includes receiving a sum at an output portion of the adder for each of the two N bit binary numbers. This output portion of the adder (for each set of two input numbers) is defined by the data path associated with the two N bit binary numbers.

In another aspect, the invention comprises a system for adding two or more sets of two N bit binary numbers with an M bit adder. The value of M is equal to the product of K and N (i.e., K*N), where K is an integer greater than or equal to two. The system includes an M bit adder for receiving each of the two or more sets of two N bit binary numbers at corresponding sets of N inputs of the adder, and for adding the sets of two N bit binary numbers. The system further includes, for each set of two N bit binary numbers, a logic gate for inhibiting a carry data path, from an N bit portion of the M bit adder (corresponding to the two N bit binary numbers), to the next adjacent N bit portion of the M bit adder. Inhibiting the carry data path isolates a contiguous N bit data path through the M bit adder corresponding to each of the two or more sets of two N bit binary numbers.

In another embodiment of the invention, the logic gate receives a gating signal, along with a kill signal from a next least significant bit path in the adder. A predetermined state of the gating signal causes a kill signal to be propagated to the next more significant bit path of the adder.

In another embodiment of the invention, the logical gate includes an AND gate.

In another embodiment of the invention, M is equal to 64, K is equal to two, and N is equal to 32. A 64 bit adder receives each of the two sets of two 32 bit binary numbers at corresponding sets of 32 inputs of the adder. For each set of two 32 bit binary numbers, the logic gate inhibits the carry data path, from a 32 bit portion of the 64 bit adder corresponding to the two 32 bit binary numbers, to the next adjacent 32 bit portion of the 64 bit adder. Inhibiting the data path in this way isolates a contiguous 32 bit data path through the 64 bit adder corresponding to each of the two or more sets of two 32 bit binary numbers.

In another embodiment of the invention, M is equal to 64, K is equal to four, and N is equal to 16. A 64 bit adder receives each of the four sets of two 16-bit binary numbers at corresponding sets of 16 inputs of the adder. For each set of two 16 bit binary numbers, the logic gate inhibits the carry data path, from a 16 bit portion of the 64 bit adder corresponding to the four 16 bit binary numbers, to the next adjacent 16 bit portion of the 64 bit adder. Inhibiting the carry data path in this way isolates a contiguous 16 bit data path through the 64 bit adder corresponding to each of the four sets of two 16 bit binary numbers.

In another aspect, the invention comprises a system for adding two or more sets of two binary numbers with fixed-width adder. The system includes an adder for receiving each of the two or more sets of binary numbers at corresponding sets of adder inputs, and for generating a sum of each set of binary numbers. Each set of binary numbers defines a distinct data path through the adder. For each set of two binary numbers, the system further includes a logic gate for inhibiting a carry data path, from each portion of the adder corresponding to each of the data paths, to a next adjacent data path. Inhibiting the carry path in this way isolates two or more contiguous data paths through the fixed-width adder corresponding to each of the two or more sets of two binary numbers.

In another embodiment of the invention, the logic gate receives a gating signal, along with a kill signal from a next least significant bit path in the adder. A predetermined state of the gating signal causes a kill signal to be propagated to the next more significant bit path of the adder.

In another embodiment of the invention, the logical gate includes an AND gate.

In another aspect, the invention comprises a system for adding two or more sets of two N bit binary numbers with an M bit adder. The value of M is equal to the product of K and N (i.e., K*N), where K is an integer greater than or equal to two. The system includes adding means for receiving each of the two or more sets of two N bit binary numbers at corresponding sets of N inputs of the adder, and for adding the sets of two N bit binary numbers. The system further includes, for each set of two N bit binary numbers, gating means for inhibiting a carry data path from an N bit portion of the M bit adder (corresponding to the two N bit binary numbers), to the next adjacent N bit portion of the M bit adder. Inhibiting the carry path in this way isolates a contiguous N bit data path through the M bit adder corresponding to each of the two or more sets of two N bit binary numbers.

In another aspect, the invention includes a system for adding two or more sets of two binary numbers with fixed-width adder. The system includes adding means for receiving each of the two or more sets of binary numbers at corresponding sets of inputs of the adder, and for generating a sum of each set of binary numbers. Each set of binary numbers defines a distinct path through the adder. Each data path corresponds to one of the sets of two binary numbers, and for adding the sets of binary numbers. For each set of two binary numbers, the system also includes gating means for inhibiting a carry data path from each portion of the adder corresponding to each of the data paths, to a next adjacent data path. Inhibiting the carry data path in this manner isolates two or more contiguous data paths through the fixed-width adder corresponding to each of the two or more sets of two binary numbers.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1:
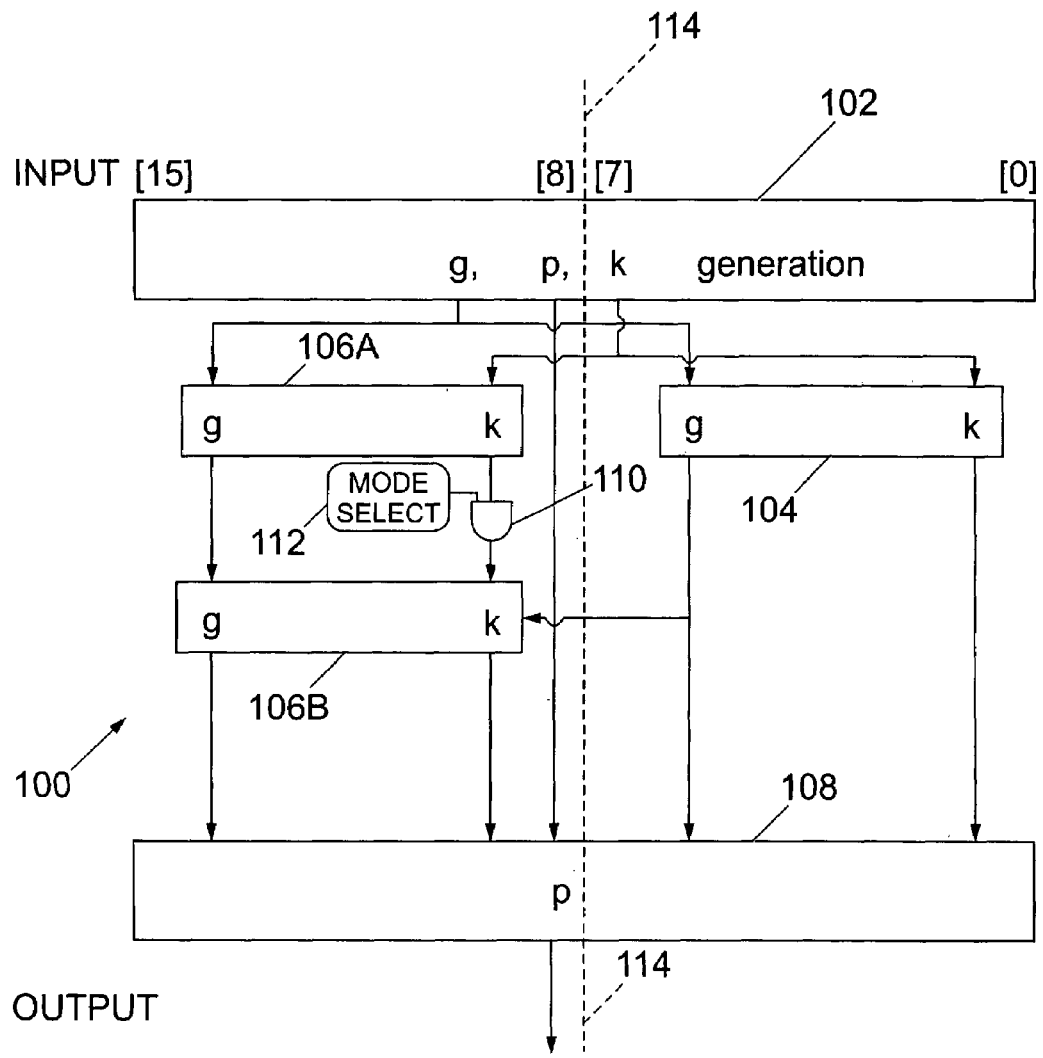
FIG. 1 shows a block diagram view of one preferred embodiment of an SIMD addition circuit according to the present invention.

FIG. 1 shows a block diagram view of one preferred embodiment of an SIMD addition circuit 100 according to the present invention. For simplicity, FIG. 1 shows only the carry generate (g), carry propagate (p) and carry kill (k) portion of the carry processing circuitry within the SIMD addition circuit 100, and only those portions of the carry processing circuitry necessary to describe the invention. Further, the exemplary embodiment of FIG. 1 corresponds to a 16 bit adder that can be configured for a single 16-bit data summing lane, or two eight-bit data summing lanes, selectable as described herein. The concept described by this embodiment may be extended to summing lanes having any number of bits, and any number of summing lanes.

The SIMD addition circuit 100 of FIG. 1 includes an initial g,p,k generation stage 102, subsequent g,k stage 104 for the less significant summing lane (bit 0 through bit 7), a first subsequent g,k stage 106A and a second subsequent g,k stage 106B for the more significant summing (bit 8 through bit 15), and a final p stage 108. The initial g,p,k generation stage 102 receives the numbers to be added at the input of the adder, and generates the first set of generate, propagate and kill signals from those numbers. The SIMD addition circuit also includes an AND gate 110 that receives the k signal from the g,k stage 106A and a mode select signal 112. The output of the AND gate 110 provides the k input to the g,k stage 106B. The g,k stage 106B receives the g signal that crosses the lane boundary 114 between the less significant summing lane and the more significant summing lane. In the architecture shown in FIG. 1, an active low k input to the g,k stage 106B inhibits (or equivalently, "kills") the g signal that crosses the lane boundary 114. A logic low mode select signal 112 forces an active low k signal into the g,k stage 106B via the and gate 110, thus inhibiting the g signal from the less significant summing lane. Inhibiting the g signal from the less significant summing lane allows each summing lane to sum the data at the corresponding inputs independently.

In another embodiment of the invention, additional AND gates may be placed at other summing lane boundaries within the adder, each receiving a distinct mode select signal, so as to create more than the two summing lanes shown in FIG. 1. Each AND gate thus provides a means for inhibiting the generate signal from the next least significant summing lane, thus preventing that generate signal from propagating across the summing lane boundary 114. Each combination of states of the mode select signals thus creates a unique set of summing lanes through the adder. For example, 64 bits is a common data width for adders in the current processing applications. In other embodiments, AND gates as described herein are placed at eight bit intervals within the adder, so that appropriate combinations of mode select signals are applied to provide two 32-bit summing lanes, four 16-bit summing lanes, or eight eight-bit summing lanes. In other embodiments of the invention, the AND gates are placed at non-symmetric intervals, so as to produce summing lanes of different data widths. In other embodiments, logic gates other than AND gates may be used to inhibit a generate signal from crossing a data lane boundary. In the embodiments described herein, the invention uses the mode select signal to force an active low kill signal, which in turn inhibits the generate signal, so an AND gate is an appropriate logic function. However by utilizing other logic senses, alternate logic gates may be used to provide the inhibit function. For example, a skilled person will appreciate that OR gates may be used if the relevant signals are invented.

Figure 2:
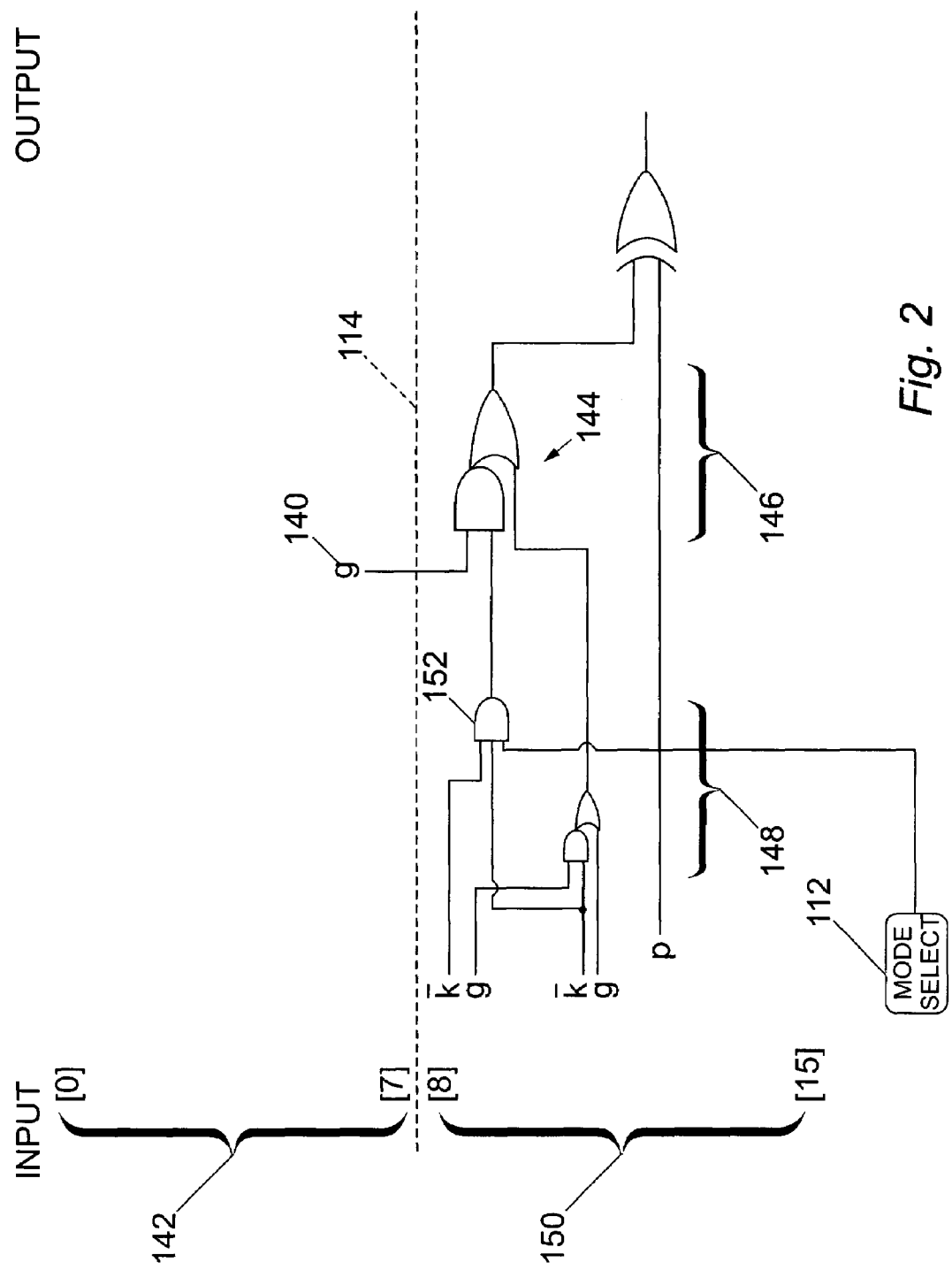
FIG. 2 illustrates a more detailed view of the adder circuit concept shown in FIG. 1.
Figure 3A:
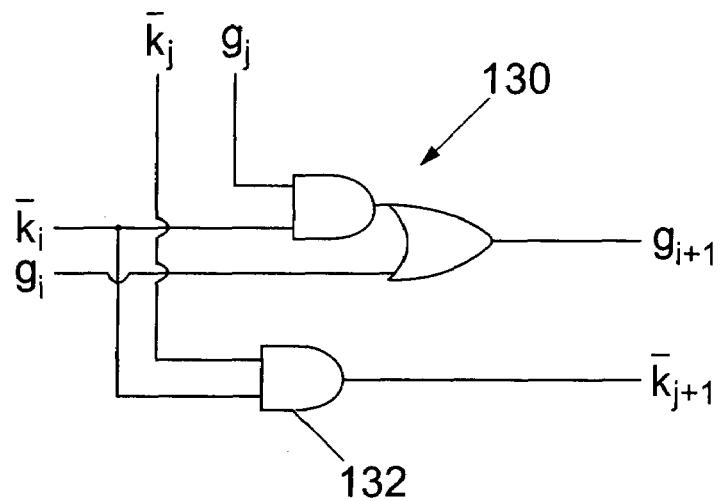
FIG. 3A shows a single arbitrary stage of a prefix adder.
Figure 3B:
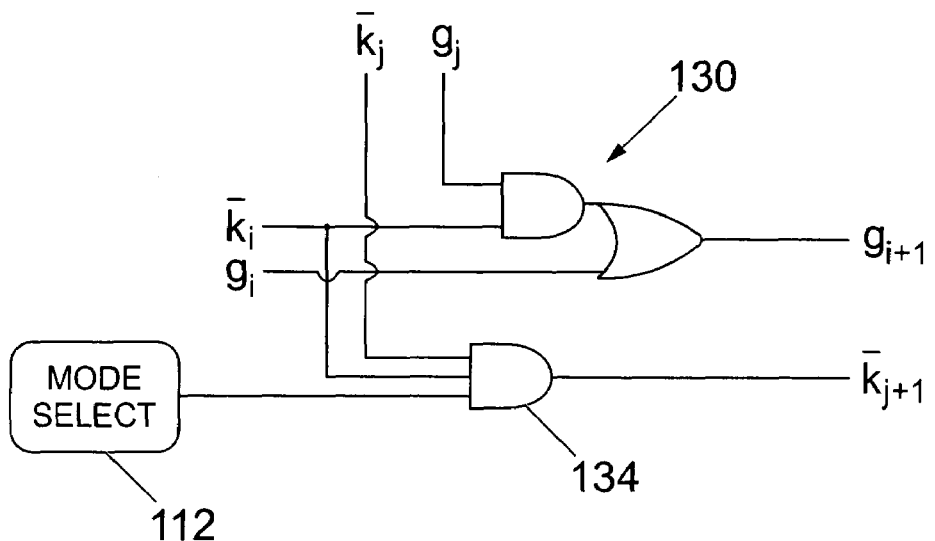
FIG. 3B shows the prefix stage of FIG. 3A configured according to the present invention.

FIG. 2 illustrates a more detailed view of the adder circuit concept shown in FIG. 1. FIG. 2 shows the relevant components of a "prefix adder" (see "A Family of Adders," S. Knowles, Proceedings of the 14th IEEE Symposium on Computer Arithmetic, 0-7695-0116-8/99, 1999). FIG. 3A shows a single arbitrary stage of a prefix adder, and FIG. 3B shows the prefix stage of FIG. 3A configured according to a preferred embodiment of the present invention. The prefix stage of FIG. 3A includes an AND-OR combination gate 130, and an AND gate 132. The AND gate of the AND-OR combination 130 receives the jth generate signal, and the ith kill signal. The OR gate of the AND-OR combination 130 receives the output of the AND gate of the AND-OR combination 130, and the ith generate signal. The AND gate 132 receives the jth kill signal and the ith kill signal. The OR portion of the AND-OR combination 130 produces the i+1th generate signal, and the AND gate 132 produces the i+1th kill signal. The prefix stage shown in FIG. 3B is identical to the prefix stage of FIG. 3A, except that the two input AND gate 132 of FIG. 3A has been replaced by a three input AND gate 134 in FIG. 3B. The third input of the AND gate 134 receives the mode select signal 112 described in FIG. 1. In the prefix stage architecture of FIG. 3B, the i+1th kill signal is forced to the active low state when the mode select signal is low, regardless of the state of the other two input kill signals. Thus, the mode select signal can force a kill of the generate in the next prefix stage.

In FIG. 2, the input of the 16 bit adder is on the left-hand side of the figure, the output of the adder is on the right-hand side of the figure, and the lane boundary 114 is shown between bit 7 and bit 8. The generate 140 from the less significant summing lane 142 is shown crossing the summing lane boundary 114, and connected to the input of the AND portion of the AND-OR combination 144 of a prefix stage 146. The previous prefix stage 148 provides generate and kill signals from initial stages of the more significant summing lane 150. The mode select signal 112 is connected to one of the inputs of the AND gate 152 of the prefix stage 148. A logic low mode select signal 112 thus forces the output of the AND gate 152 to a logic low, which inhibits the generate signal 140 from the less significant summing lane from propagating through the prefix stage 144. Thus, a logic low mode select signal 112 isolates the less significant summing lane from the more significant summing lane by effectively preventing the generate signal 140 from crossing the lane boundary 114.

The architecture shown and described in FIG. 3B is particularly useful because changing from a two input AND gate 132 (in FIG. 3A) to a three input AND gate in the preferred embodiment of the present invention does not affect the timing of the prefix stage. This is because the propagation delay through the AND-OR combination 130 is greater than either a two or three input AND gate, so the AND-OR combination 130 remains the limiting component in the data path. Further, changing from a two input AND gate 132 to a three input AND gate does not significantly add to the size or complexity of the circuit, as compared to the adding and multiplexing circuitry employed by prior art solutions as described herein.

Although FIGS. 2, 3A and 3B describe an exemplary embodiment using prefix adders, the present invention may also be used in other adder architectures to create an adder with multiple, variable width summing channels. All adders constructed and arranged according to the present invention prevent unwanted signals (i.e., signals related to the carry path) from crossing summing lane boundaries in different processing modes. Further, by eliminating these unwanted signals selectively, the same adder logic can be used for each processing mode simply by varying the combination of mode select control signals.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of adding two or more sets of two N bit binary numbers with an M bit adder, where M is equal to K*N, K being an integer greater than or equal to two, comprising:

providing each of the two or more sets of two N bit binary numbers to adjacent sets of N inputs of the M bit adder;

inhibiting a carry data path, from each N bit portion of the M bit adder corresponding to each set of two N bit binary numbers, to the next adjacent N bit portion of the M bit adder, by providing a gating signal to a logical gate, along with a kill signal from a next least significant bit path in the adder, such that a predetermined state of the gating signal causes the kill signal to be propagated to the next more significant bit path of the adder, so as to isolate a contiguous N bit data path through the M bit adder corresponding to each of the two or more sets of two N bit binary numbers; and for each of the two N bit binary numbers, receiving a sum at an output portion of the adder, wherein the output portion of the adder is defined by the data path associated with the two N bit binary numbers.

2. The method according to claim 1, wherein the logical gate includes an AND gate.

3. The method according to claim 1, wherein M is equal to 64, K is equal to two, and N is equal to 32, and the method further includes:

providing each of the two sets of two 32 bit binary numbers to adjacent sets of 32 inputs of the 64 bit adder; and inhibiting a carry data path, from the least significant 32 bit portion of the 64 bit adder, to the most significant 32 bit portion of the 64 bit adder, so as to isolate two contiguous 32 bit data paths through the 64 bit adder.

4. The method according to claim 1, wherein M is equal to 64, K is equal to eight, and N is equal to eight, and the method further includes:

providing each of the eight sets of two eight bit binary numbers to adjacent sets of eight inputs of the 64 bit adder; and inhibiting a carry data path, from each eight bit portion of the 64 bit adder corresponding to each set of two eight bit binary numbers, to the next adjacent eight bit portion of the 64 bit adder, so as to isolate a contiguous eight bit data path through the 64 bit adder corresponding to each of the two or more sets of two eight bit binary numbers.

5. A method of adding two or more sets of two binary numbers with a fixed-width adder, comprising:

providing each of the two or more sets of two binary numbers to adjacent sets of inputs of the fixed-width adder, so as to define two or more data paths through the adder, each corresponding to one of the sets of two binary numbers;

inhibiting a carry data path, from each portion of the adder corresponding to each of the data paths, to a next adjacent data path, by providing a gating signal to a logical gate, along with a kill signal from a least significant bit path in the adder, such that a predetermined state of the gating signal causes the kill signal to be propagated to a more significant bit path of the adder, so as to isolate two or more contiguous data paths through the fixed-width adder corresponding to each of the two or more sets of two binary numbers; and for each of the two binary numbers, receiving a sum at an output portion of the adder, wherein the output portion of the adder is defined by the data path associated with the two binary numbers.

6. A method of adding a first set of two N bit binary numbers and a second set of two N bit binary numbers with a 2N bit binary adder, comprising:
  providing the first set of two N bit binary numbers to the least significant N inputs of the 2N bit adder;
  providing the second set of two N bit binary numbers to the most significant N inputs of the 2N bit adder;
  inhibiting a carry data path, from a least significant portion of the 2N bit binary adder, to a most significant portion of the 2N bit binary adder via a gating signal to a logical gate, along with a kill signal from a first least significant N bit data path in the adder, such that a predetermined state of the gating signal causes the kill signal to be propagated to a second more significant N bit data path of the adder, so as to isolate the first N bit data path corresponding to the first set of two N bit binary numbers from the second N bit data path corresponding to the second set of two N bit binary numbers; and
  for each of the two N bit binary numbers, receiving a sum at an output portion of the adder, wherein the output portion of the adder is defined by the data path associated with the two N bit binary numbers.

7. A system for adding two or more sets of two N bit binary numbers with an M bit adder, where M is equal to K*N, K being an integer greater than or equal to two, comprising:
  an M bit adder for receiving each of the two or more sets of two N bit binary numbers at corresponding sets of N inputs of the adder, and for adding the sets of two N bit binary numbers; and
  for each set of two N bit binary numbers, a logic gate for inhibiting a carry data path, from an N bit portion of the M bit adder corresponding to the two N bit binary numbers, to the next adjacent N bit portion of the M bit adder, so as to isolate a contiguous N bit data path through the M bit adder corresponding to each of the two or more sets of two N bit binary numbers
  wherein the logic gate receives a gating signal, along with a kill signal from a next least significant bit path in the adder, such that a predetermined state of the gating signal causes the kill signal to be propagated to the next more significant bit path of the adder.

8. The system according to claim 7, wherein the logical gate includes an AND gate.

9. The system according to claim 7, wherein M is equal to 64, K is equal to two, and N is equal to 32, such that a 64 bit adder receives each of the two sets of two 32 bit binary numbers at corresponding sets of 32 inputs of the adder; and,
  for each set of two 32 bit binary numbers, the logic gate inhibits the carry data path, from a 32 bit portion of the 64 bit adder corresponding to the two 32 bit binary numbers, to the next adjacent 32 bit portion of the 64 bit adder, so as to isolate a contiguous 32 bit data path through the 64 bit adder corresponding to each of the two or more sets of two 32 bit binary numbers.

10. The system according to claim 7, wherein M is equal to 64, K is equal to four, and N is equal to 16, such that a 64 bit adder receives each of the four sets of two 16-bit binary numbers at corresponding sets of 16 inputs of the adder; and,
  for each set of two 16 bit binary numbers, the logic gate inhibits the carry data path, from a 16 bit portion of the 64 bit adder corresponding to the four 16 bit binary numbers, to the next adjacent 16 bit portion of the 64 bit adder, so as to isolate a contiguous 16 bit data path through the 64 bit adder corresponding to each of the four sets of two 16 bit binary numbers.

11. A system for adding two or more sets of two binary numbers with fixed-width adder, comprising:
  an adder for receiving each of the two or more sets of binary numbers at corresponding sets of inputs of the adder, so as to define two or more data paths through the adder, each corresponding to one of the sets of two binary numbers, and for adding the sets of binary numbers; and,
  for each set of two binary numbers, a logic gate for inhibiting a carry data path, from each portion of the adder corresponding to each of the data paths, to a next adjacent data path, so as to isolate two or more contiguous data paths through the fixed-width adder corresponding to each of the two or more sets of two binary numbers;
  wherein the logic gate receives a gating signal, along with a kill signal from a next least significant bit path in the adder, such that a predetermined state of the gating signal causes the kill signal to be propagated to the next more significant bit path of the adder.

12. The system according to claim 11, wherein the logical gate includes an AND gate.

13. A system for adding two or more sets of two N bit binary numbers with an M bit adder, where M is equal to K*N, K being an integer greater than or equal to two, comprising:
  adding means for receiving each of the two or more sets of two N bit binary numbers at corresponding sets of N inputs of the adder, and for adding the sets of two N bit binary numbers; and,
  for each set of two N bit binary numbers, gating means for inhibiting a carry data path from an N bit portion of the M bit adder corresponding to the two N bit binary numbers, to the next adjacent N bit portion of the M bit adder, so as to isolate a contiguous N bit data path through the M bit adder corresponding to each of the two or more sets of two N bit binary numbers;
  wherein the gating means receives a gating signal, along with a kill signal from the N bit portion of the M bit adder, such that a predetermined state of the gating signal causes the kill signal to be propagated to the adjacent N bit portion of the M bit adder.

14. A system for adding two or more sets of two binary numbers with fixed-width adder, comprising:
  adding means for receiving each of the two or more sets of binary numbers at corresponding sets of inputs of the adder, so as to define two or more data paths through the adder, each corresponding to one of the sets of two binary numbers, and for adding the sets of binary numbers; and,
  for each set of two binary numbers, a gating means for inhibiting a carry data path from each portion of the adder corresponding to each of the data paths, to a next adjacent data path, so as to isolate two or more contiguous data paths through the fixed-width adder corresponding to each of the two or more sets of two binary numbers;
  wherein the gating means receives a gating signal, along with a kill signal from a data path of the adder, such that a predetermined state of the gating signal causes the kill signal to be propagated to the next adjacent data path of the adder.

15. A method of adding two or more sets of two N bit binary numbers with an M bit adder, where M is equal to K*N, K being an integer greater than or equal to two, comprising:

provide each of the two or more sets of two N bit binary numbers to adjacent sets of N inputs of the M bit adder;

inhibiting a carry data path from each N bit portion of the M bit adder corresponding to each set of two N bit binary numbers, to the next adjacent N bit portion of the M bit adder, so as to isolate a contiguous N bit data path through the M bit adder corresponding to each of the two or more sets of two N bit binary numbers, by providing a gating signal to a logical gate, along with a kill signal from a next least significant bit path in the adder, such that a predetermined state of the gating signal causes a kill signal to be propagated to the next more significant bit path of the adder; and, for each of the two N bit binary numbers, receiving a sum at an output portion of the adder, wherein the output portion of the adder is defined by the data path associated with the two N bit binary numbers.

16. A method of adding two or more sets of two binary numbers with fixed-width adder, comprising:

providing each of the two or more sets of two binary numbers to adjacent sets of inputs of the fixed-width adder, so as to define two or more data paths through the adder, each corresponding to one of the sets of two binary numbers;

inhibiting a carry data path, from each portion of the adder corresponding to each of the data paths to a next adjacent data path, so as to isolate two or more contiguous data paths through the fixed-width adder corresponding to each of the two or more sets of two binary numbers, by providing a gating signal to a logical gate, along with a kill signal from a next least significant bit path in the adder, such that a predetermined state of the gating signal causes a kill signal to be propagated to the next more significant bit path of the adder; and, for each of the two binary numbers, receiving a sum at an output portion of the adder, wherein the output portion of the adder is defined by the data path associated with the two binary numbers.

* * * * *